United States Patent
Ridings

(10) Patent No.: US 6,862,836 B1
(45) Date of Patent: Mar. 8, 2005

(54) FISHING LURE WITH AUTOMATICALLY RETRACTING HOOK

(76) Inventor: Barry L. Ridings, 10880 W. Reed Valley Rd., Fayetteville, AR (US) 72704

(*) Notice: Subject to any disclaimer, the term of this patent is extended or adjusted under 35 U.S.C. 154(b) by 0 days.

(21) Appl. No.: 10/189,719

(22) Filed: Jul. 2, 2002

(51) Int. Cl.$^7$ .............................................. A01K 85/02
(52) U.S. Cl. .............................................. 43/35; 43/37
(58) Field of Search ............................. 43/34, 35, 36, 43/37, 42.09, 42.1, 42.41, 42.44

(56) References Cited

U.S. PATENT DOCUMENTS

| | | | | | |
|---|---|---|---|---|---|
| 1,486,028 A | * | 3/1924 | Meighen | .......................... | 43/35 |
| 1,638,923 A | * | 8/1927 | Danielson | ....................... | 43/35 |
| 2,044,702 A | * | 6/1936 | Kalyu | ............................. | 43/35 |
| 2,511,223 A | * | 6/1950 | Sturcke | .......................... | 43/35 |
| 2,643,479 A | * | 6/1953 | Stevenson | ....................... | 43/36 |
| 3,410,019 A | * | 11/1968 | Landi | ............................. | 43/35 |
| 3,411,233 A | * | 11/1968 | Hopper | ........................... | 43/35 |
| 3,665,634 A | * | 5/1972 | Baud | .............................. | 43/35 |
| 3,739,517 A | * | 6/1973 | Schleif | ........................... | 43/35 |
| 4,176,489 A | * | 12/1979 | Levstik | ........................... | 43/35 |
| 4,562,661 A | * | 1/1986 | Messinger et al. | ............. | 43/35 |
| 4,765,084 A | * | 8/1988 | Braden | ........................... | 43/34 |
| 4,782,618 A | * | 11/1988 | Rainey | ........................... | 43/35 |
| 4,827,656 A | | 5/1989 | Ohnishi | .......................... | 43/34 |
| 5,161,323 A | * | 11/1992 | Braden | ........................... | 43/37 |
| 5,218,778 A | | 6/1993 | Szantor | ...................... | 43/42.41 |
| 5,301,453 A | * | 4/1994 | Terrill | ....................... | 43/42.09 |
| 5,513,464 A | * | 5/1996 | Hutchins | ........................ | 43/34 |
| 5,822,911 A | * | 10/1998 | Cox | ................................ | 43/37 |
| 6,308,453 B1 | * | 10/2001 | Meyer | ............................ | 43/37 |

* cited by examiner

Primary Examiner—Peter M. Poon
Assistant Examiner—David Parsley
(74) Attorney, Agent, or Firm—Keisling Pieper & Scott PLC; Trent C. Keisling; David B. Pieper

(57) ABSTRACT

The present lure automatically retracts pivoting hooks into its body during retrieval but also quickly deploys its pivoting hooks upon the appearance of a strike by a fish. The lure has a mechanism with two legs independently attached at opposite axes points, and mounted between two parallel side plates. The rear leg functions as the trigger mechanism by rotating around the rear mounting axis, against the front leg. The front leg of the mechanism holds a hook or hooks, and is aligned with the rear leg in a common plane. The legs are designed such that they are not allowed to separate from each other by being captivated between the two mounting plates. A leading collector hydraulically biases the hook inside the body unless within a fish.

11 Claims, 9 Drawing Sheets

FISHING LURE WITH AUTOMATICALLY RETRACTING HOOK

BACKGROUND OF THE INVENTION

1. Field of the Invention

The present invention relates generally to fishing lures and more specifically to a fishing lure with an automatically retracting hook assembly. This invention relates more specifically to a mechanism providing artificial lures with the ability to hide one or multiple hooks, until such time as a fish strikes the lure. Known art may be found in U.S. class 43, subclasses 34, 35 and related subclasses thereunder as well as other classes and subclasses.

2. Known Art

Those skilled in the art will appreciate that the sport of fishing has evolved significantly over time. For example, fishing has progressed from being just a food gathering activity into also a leisure and sporting activity. Further, both leisure and sports fishing have broadened and now encompass an ever widening segment of society. Sports fishing and leisure fishing are also activities that may be undertaken in almost any part of the world.

Many different types of sports fishing and leisure fishing are known and appreciated by the fishing public. For example, deep sea fishing, lake or pond fishing, and stream or river fishing are but a few of the many divisions into which such activities can be categorized. The present invention may be particularly well suited and adapted for use in both lake and pond as well as stream and river fishing. It may also be advantageously employed selectively with deep sea fishing.

Regardless of the type of leisure or sports fishing involved, the equipment used by fishermen has become fairly standardized. For example, most fishing tackle includes a rod, reel, line and an attractant with a method for "hooking" the fish. The attractant is typically either a hook with live "bait" or a conventional fishing lure.

The majority of conventional fishing lures are designed to mimic closely the general appearance of various types of food or "bait" to attract fish (with the exception of the exposed hooks). A common and often irritating problem encountered with conventional fishing lures is that they are susceptible to becoming snagged on submerged objects while being drawn through the water. In addition to snagging, the use of exposed hooks on the exterior of a lure defeats the purpose of making lures that truly resemble bait.

Those skilled in the art of fishing will appreciate that the often irritating annoyance with conventional lures having exposed hooks resulting from the snagging of the exposed hook upon debris during lure retrieval also often results in lost or damaged lures. Attempts have been made to minimize these annoyances.

A number of lures have been proposed that have a retractable hook. Several of these lures have a hook that is normally sustained in a retracted position, and then moves into an exposed position when a fish strikes the lure, thus allowing the hook to become available to "hook" the fish. When the hook is retracted, the lure can pass through the weeds without being snagged.

Although these pre-existing lures are generally adequate for their intended purpose, they have not been satisfactory in all respects. In addition, there is no pre-existing lure that offers a simple internal mechanism design, applicable to a variety of lure shapes, that can be built cheaply and implemented easily, within conventional lure designs without significant revision.

For example, U.S. Pat. No. 4,827,656 to Ohnishi shows a lure plug for fishing including a plug body made of wood or plastics and having a slot extending in a longitudinal direction of the plug body, a hook rotatably secured to the plug body between a position within the slot and a position exposed out of the plug body, a resilient body provided in the slot such that the hook is biased into the position within the slot and an operating member movably provided in the slot. When a fish bites the lure plug, the operating member pushes the hook out of the plug body against a resilient biasing force of the resilient body. When the fish discharges the lure plug, the hook is automatically returned into the position within the plug body, so that the lure plug is effectively prevented from being picked up by obstacles.

U.S. Pat. No. 4,562,661 to Messinger et al. shows a fish lure with concealed hooks. The Messinger device has a hollow body preferably simulating prey for game fish that is slotted on its dorsal and ventral surfaces. At one slot, a lever in the form of a body part of the prey is pivotally secured with a portion extending inwardly and a portion exposed. At the other slot, a fish hook is pivotally mounted. A spring within the hollow body extends between and engages the fishhook and the lever. When the fishhook is depressed to a concealed position within the hollow body, the spring is compressed, a catch on the hook engages a keeper on the lever to retain the hook within the body. If a game fish strikes the lure and presses the exposed portion of the lever, the lever pivots to a position which releases the catch from the keeper and permits the spring to eject the hook to an external position where it can hook the game fish.

U.S. Pat. No. 3,665,634 to Baud shows a fish plug lure. The Baud device includes a fish lure having a body within which is pivoted a hook which can move from a fully-retracted position to an extended position. The leader extending from the fish tackle to the lure is secured to the hook in such a position that the hook is stressed by leader tension toward the extended position. Trigger means, actuatable by the fish, retains the hook in the retracted position until actuated. A resilient member urges the trigger means into the hook retention position. The body of the fish lure resembles fish bait and the trigger means resembles a natural fin thereon.

U.S. Pat. No. 4,782,618 to Rainey shows a weedless fishing lure. The Rainey device includes a weedless fishing lure having at least one hook with an integral cam and a spring within a lure body movable between a retracted and an extended position. The lure body generally is formed of a pair of upper and lower halves, having a separation plate located therein, and which positions the cam of this invention into its operative condition, wherein the securement of a spring therewith normally sustains the cam and its hooks rearwardly and concealed within the lure body, while a linkage connecting the same cam, and when subjected to tensioning pressure, exceeding that of the spring, forces the cam means forwardly, for pivoting of its hooks upwardly, and their exposure externally of the lower body for impaling any fish biting thereon.

U.S. Pat. No. 5,218,778 to Szantor is for a fishing lure. The lure includes a lure body having a hook moveably mounted thereon. The hook moves between a first postion in which its barbed end is located within a protective opening in the lure body and a second position in which the hook is located outside of the lure body for use in hooking a fish. A portion of the hook protrudes outside the lure body in the first position of the hook to be contacted by the mouth of the fish as the fish strikes the lure, thereby allowing the strike to be the motive force for moving the hook outside the lure body. Accordingly, the hook is protected within the lure body except for when the fish strikes the lure to minimize the chances of the lure being caught on weeds or similar underwater obstructions.

The foregoing devices rely principally upon a resilient member, spring or some similar mechanism responsive to a trigger or latch or the like to expose hooks that are retracted within the lure body. A common problem encountered with devices of this type involves the fact that springs tend to easily become clogged in many underwater environments where organic materials, dirt, and other debris are commonly present.

Another problem with devices of this type is that springs, resilient biasing mechanisms, triggers with latches and similar mechanisms can slow deployment of the hook. Since a fish strike may only last a split-second, the speed of hook deployment is critical. Therefore, any method of increasing the speed of hook deployment by decreasing the complexity of the triggering mechanism is desirable.

Furthermore, devices with latches may be falsely triggered by many events, including the common event of the lure striking the water after a cast. In particular, many sports fishermen often cast lures directly at objects such as logs, stumps, pilings, piers and the like. Such casts often result in the lure forcibly striking an immobile object and then falling downwardly into the water whereupon fishing activities immediately initiate. This practice can have the unintended consequence of triggering lures with latches and the like.

Thus, it is desirable to provide an improved fishing lure for the art. In particular, there is a need for a lure that may be cast in a variety of different manners while being adapted to still be deployed in a manner that enables the user to avoid entanglement in weeds, trees, bark, pilings, piers, and the like.

BRIEF SUMMARY OF THE INVENTION

The present invention addresses the above perceived need in the art for an improved fishing lure. In particular, the present invention provides a simple and efficient mechanism that may be easily deployed in a variety of different situations by a fisherman. The lure in accordance with the present invention enables a fisherman to easily cast the lure and then immediately deploy the lure in a substantially snag-free configuration. The lure may be deployed by casting it directly at and forcefully striking objects such as trees, limbs, piers, docks, pilings, and the like. The fishing lure in accordance with the present invention may be easily retrieved after casting and dependably used to catch fish.

The lure in accordance with the present invention automatically retracts its pivoting hooks into its body during retrieval but also quickly deploys its pivoting hooks upon the occurrence of a strike by a fish.

The object and purpose of the invention, including those set forth in the background of the invention, are met according to the invention by providing in one exemplary embodiment a mechanism designed with two legs independently attached at opposite axes points, and mounted between two parallel side plates. The tolerance between the parallel plates is such that the legs can move freely within, without allowing the legs enough space to pass. The rear leg functions as the trigger mechanism by rotating around the rear mounting axis and bearing against the front leg. The front leg of the mechanism holds a hook or hooks, and is aligned with the rear leg in a common plane, in the space provided between the two parallel mounting plates. The front leg is mounted around an axis and is allowed to move freely between the two fixed mounting plates. The legs are designed such that they are not allowed to separate from each other by being captivated between the two mounting plates.

In another exemplary embodiment, a fishing lure in accordance with the present invention includes a slim hook and trigger compartment that is adapted to be placed between the halves of a conventional fishing lure to thereby enable the removal of conventional fishing hooks associated with the lure combination. The hook and trigger compartment includes a forward axle and a spaced apart rearward axle about which the front leg or hook mechanism and rear leg or trigger mechanism pivot respectively. The axles are captivated between spaced apart side plates or shells that form side boundaries for the hook and trigger compartment. Ideally, the side plates have an outline similar to that of the lure halves. Thus, the hook and trigger compartment may be easily placed between the lure halves and confined to the general outline thereof.

In another exemplary embodiment, the hook and trigger compartment is included in a multiple component fishing lure that may be easily configured by a user to meet a variety of desirable fishing characteristics. The lure may include a front member, a rear member, sides and the hook and trigger assembly compartment.

Thus, the multiple component fishing lure may include six components, namely (2) sides; (2) swing legs, (1) front lock/baffle (1) rear lock/tail. The sides are interchangeable and snap together with, each swing leg mounted to an axis between the side plates. The user may select the front and rear lock pins based on conditions and desired lure characteristics, including depth of use, weight, action, and/or style.

The action of retrieving a fishing lure, using this invention, will allow the hook(s) of the invention to remain retracted between the two parallel plates through the flow of water against a nose baffle attached in a plane perpendicular to the front leg. The invention legs are designed and positioned within opposing mounting plate shapes (as determined by the size and shape of the intended lure) such that the front leg forward movement is prohibited when the hook(s) are in the maximum exposed (strike) position. The rear leg upward movement is prohibited once the front and rear legs align along the common length between them (in the retracted, neutral position).

It is an object of the invention to provide a hidden hook mechanism for use in lures, which is durable, rugged, low cost, reliable, and easily implemented in a multitude of lure designs.

It is further the object of the invention to provide new freedom in the creation of lures that more closely resemble bait.

It is an object of the present invention to provide an improved fishing lure that may be dependably deployed and retrieved in a substantially snag-free configuration.

Another object of the present invention is to provide an improved lure.

Yet another object of the present invention is to provide an improved lure that may be used by fishermen to catch fish.

Another object of the present invention is to provide an easily configurable lure that may be easily adapted to a wide variety of fishing conditions.

Another object of the present invention is to provide a lure that may be easily used with minimal tools and training.

These and other objects and advantages of the present invention, along with features of novelty appurtenant thereto, will appear or become apparent in the course of the descriptive sections.

BRIEF DESCRIPTION OF THE SEVERAL VIEWS OF THE DRAWING

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
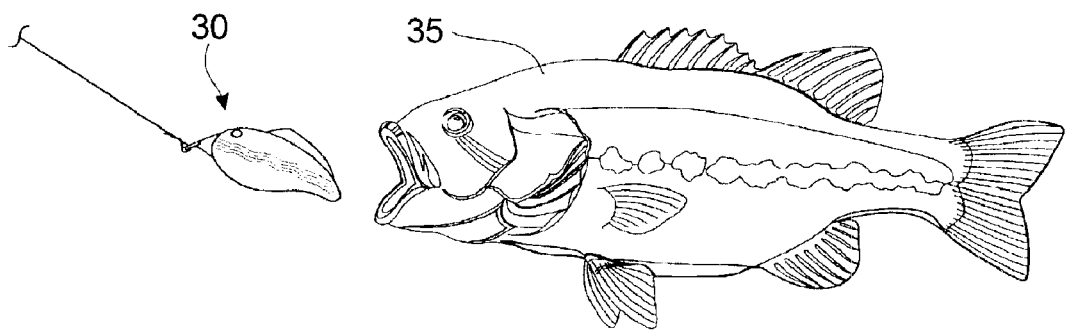
FIG. 1 is an environmental view showing an exemplary embodiment of a fishing lure with retractable hook in accordance with the present invention with retracted hooks and deployed to attract a fish; and, FIG. 2 is an environmental view thereof with portions omitted for clarity, showing the fishing lure with retracted hooks and attracting a fish.
Figure 2:
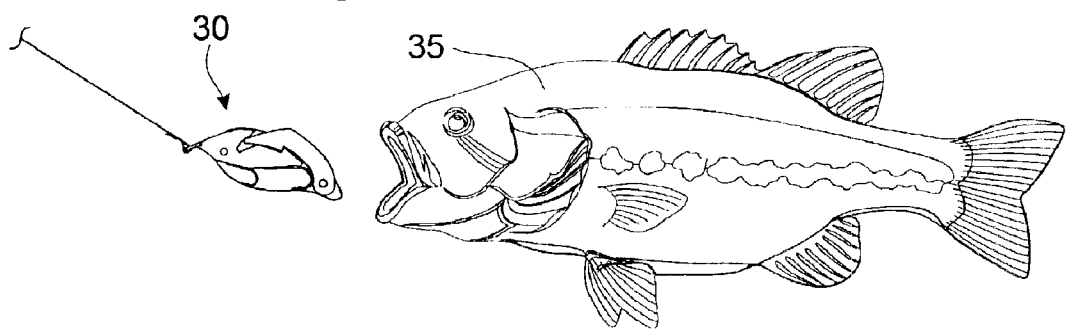
Figure 3:
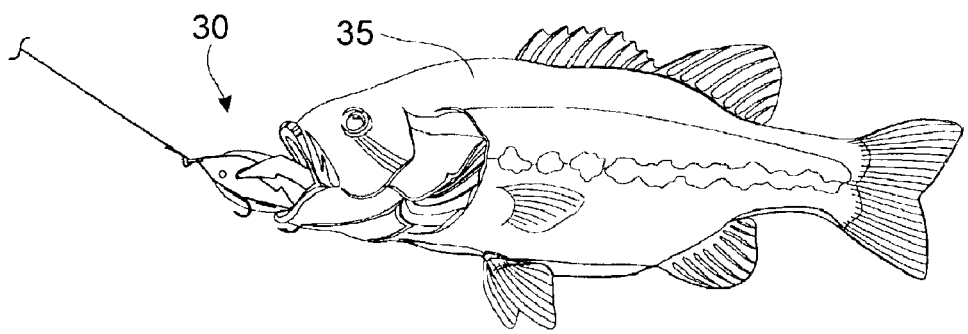
FIG. 3 is an environmental view thereof with portions omitted for clarity, showing the fishing lure struck by a fish and with its hooks deployed to capture the striking fish.
Figure 4:
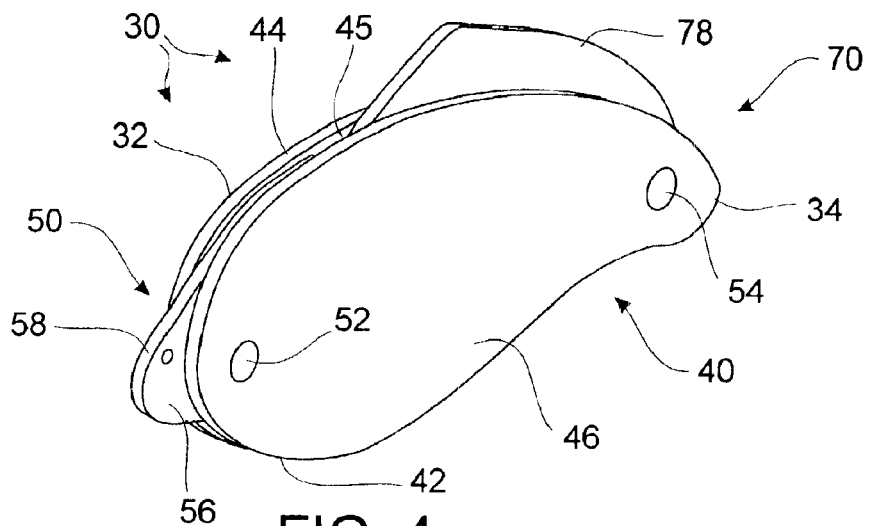
FIG. 4 is a perspective view of one exemplary embodiment in accordance with the invention.

The present invention addresses a perceived need in the art for an improved fishing lure. In particular, the present invention provides a simple and efficient mechanism that may be easily deployed in a variety of different situations by a fisherman. The lure in accordance with the present invention is generally indicated by reference numeral 30 in FIGS. 1–24. The lure 30 enables a fisherman to easily cast the lure 30 and then immediately deploy the lure 30 with its hooks in a substantially snag-free configuration automatically retracted within the periphery of the lure 30. Aerodynamic and hydrodynamic forces are sufficient to retain the lure 30 in a substantially snag-free configuration while the lure remains responsive to fish strikes to immediately deploy retractable hooks to catch the striking fish. As a result, the lure 30 may be deployed by casting it directly at and forcefully striking objects such as trees, limbs, piers, docks, pilings, and the like. Thus, the fishing lure 30 in accordance with the present invention may be easily retrieved after casting and dependably used to catch fish.

The lure 30 in accordance with the present invention automatically retracts pivoting hooks 90 into a hollow interior portion of its body 40 during casting and retrieval because of aerodynamic and hydrodynamic forces. The lure 30 also quickly deploys its pivoting hooks 90 exteriorly of its body periphery 42 when struck by a fish 35 (FIGS. 1–24).

Attaching the line directly to the rotating hook member will have the following effect. The force of water flowing over the main body of the line will serve to keep the hooks in a retracted position during retrieval by creating a slight pressure around the front axis. Since the member rotates freely with respect to the lure body, the body will naturally be rotated by a force in the opposite direction from water movement. When struck by a fish this hydro-dynamic retraction is overcome easily due to the moment differential between axis and rotating members.

In one exemplary embodiment it has been determined that a rotation of 1 cm by the rear member deflects the hole supporting the line on the front member 1–2 mm. This 10:1 ratio virtually eliminates any force required by the fish to expose the hooks. Thus the amount of the front member extending outside the body of the lure is reduced, and the need for the forward plate may be substantially curtailed or altogether eliminated.

Attaching the retrieved line to the rotating hook member will also act to maintain retraction of hooks during retrieval. Since deflection at impact is perpendicular to the direction of retrieval the attaching line to the hook member will simplify and improve the design, and enhance performance.

Regardless of the shape or dimensions of the lure embodiment, positioning the line attachment hole in the front hook member and slightly above the axis plane will sustain hook retraction during retrieval while maintaining ease of deployment.

The lure 30 has a front 32 with a leader 38 for securing a fishing line to the lure and a spaced apart rear 34. The leader may include a flat portion to increase the water pressure upon the lure 30 (FIGS. 4–10) or conform substantially to the lure outline (FIGS. 11–14). The lure 30 includes an intermediate body 40. Body 40 preferably mimics bait or other food to attract a fish 35 and entice the fish 35 to eat or "strike" the lure 30.

In one exemplary embodiment, the lure 30 includes an at least partially hollow body 40. Body 40 includes two spaced apart parallel side plates 44, 46 that define a hollow interior 45. Plates 44, 46 are spaced apart by two pins or axles or axes.

The body interior 45 houses portions of two pivoting legs 50 and 70. The front leg 50 is preferably mounted proximate the lure front 32 by the front pin or axis 52 that is also proximate the lure front 32 while the rear leg 70 is preferably mounted proximate the lure rear 34 and the rear axis 72 is also proximate the lure rear 34. Each pin axis 52, 72 passes through a hole penetrating each leg to rotatably secure each leg 50, 70 to the body 40.

Each leg 50, 70 is thus independently captivated in the housing interior 45 by the opposite axes 52, 72 respectively. As a result, the legs 50, 70 are rotatably captivated between the two parallel side plates 42, 44 by either axis 52 or 72.

The tolerance between the parallel plates 42, 44 is such that the legs 50, 70 can move freely within, without allowing the legs 50, 70 enough space to pass. In one exemplary embodiment, the tolerance between plates 42, 44 is approximately 0.1 to 0.5 inches.

Each leg 50, 70 includes a frame 55, 75. The leading or front portion 56 of frame 55 protrudes outwardly from interior 45 to form a leading collector 58 to which leader 38 is integrally secured. When the lure 30 is drawn through water, the passing water strikes collector 58 to hydrodynamically retain the hook assembly 90 within the interior 45, as will be more fully discussed hereinafter.

The front leg frame 55 extends rearwardly from the collector 58, forming an elongated upper section 60 adjacent the lowermost portion 80 of rear frame 70. The upper section 60 is cut by a central arcuate slot 62 that receives a protruding follower 82 on the rear leg 70. A forward ledge 64 defines the forward extent of the slot 62 while a rearward ledge 66 forms a keeper defining the rearmost extent of the slot 62.

The rear leg 70 functions as a trigger mechanism by rotating around the rear mounting axis 72 and against the front leg 60 to force it downwardly to expose the hook assembly 90 during a strike.

The rear leg 70 includes a frame 75. The frame 75 extends forwardly from the rear axis 72. A substantial trigger portion 78 is defined along the uppermost edge of the frame 75. The trigger 78 protrudes upwardly from the interior 45 and resides exteriorly to the body 40. The forward edge and lowermost portion 80 of frame 70 forms a follower 82 the slides in slot 62. The rearward ledge 86 of the follower 82 forms a keeper defining the rearmost extent of the follower 82.

The follower 82 slides in slot 62 as the lure 30 is used. When cast or retrieved, the follower ledge 86 abuts the slot ledge 66 to keep trigger 78 exposed fully and hook assembly 90 retracted fully. When struck, the trigger 78 is forced downwardly to force follower 82 to slide in slot 62 and thereby to expose hook assembly 90.

The front leg 50 supports the hook assembly 90 with one or more hooks 92 on its lowermost portion. The front leg 50 is aligned with the rear leg 70 in a common plane, in the space provided between the two parallel mounting plates 44, 46. The front leg is mounted around an axis 52 and is allowed to move freely between the two fixed mounting plates 44, 46. The legs 50, 70 are captivated between the two mounting plates 44, 46 such that they are not allowed to separate from each other during respective movements by either leg.

Figure 5:
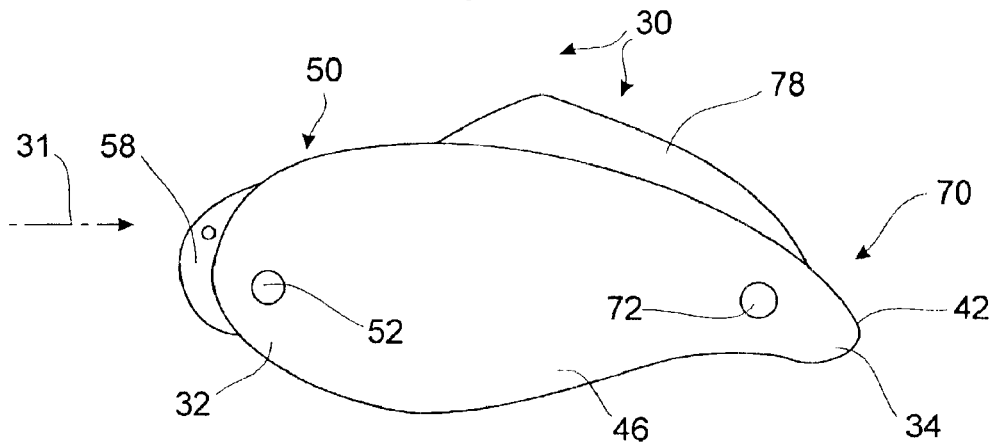
FIG. 5 is a side elevational thereof, with the opposite side being a mirror image thereof.
Figure 6:
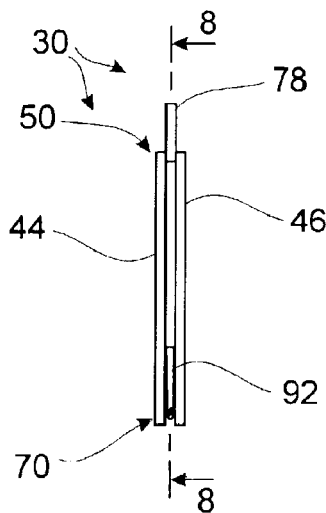
FIG. 6 is a front elevational view thereof.
Figure 7:
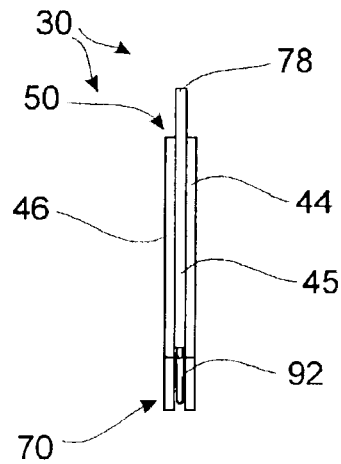
FIG. 7 is a rear elevational view thereof.
Figure 8:
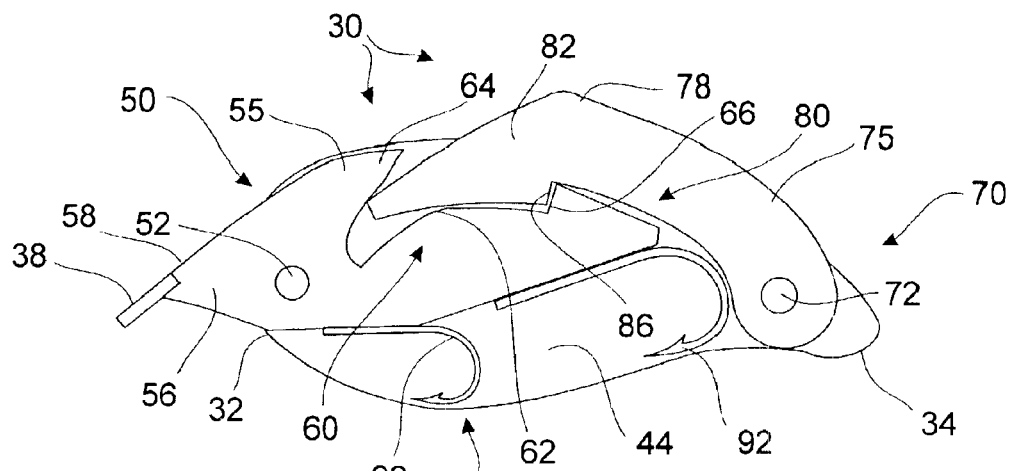
FIG. 8 is a cross-sectional view taken along line 8—8 of FIG. 6 showing the lure with the hook in a retracted position.
Figure 9:
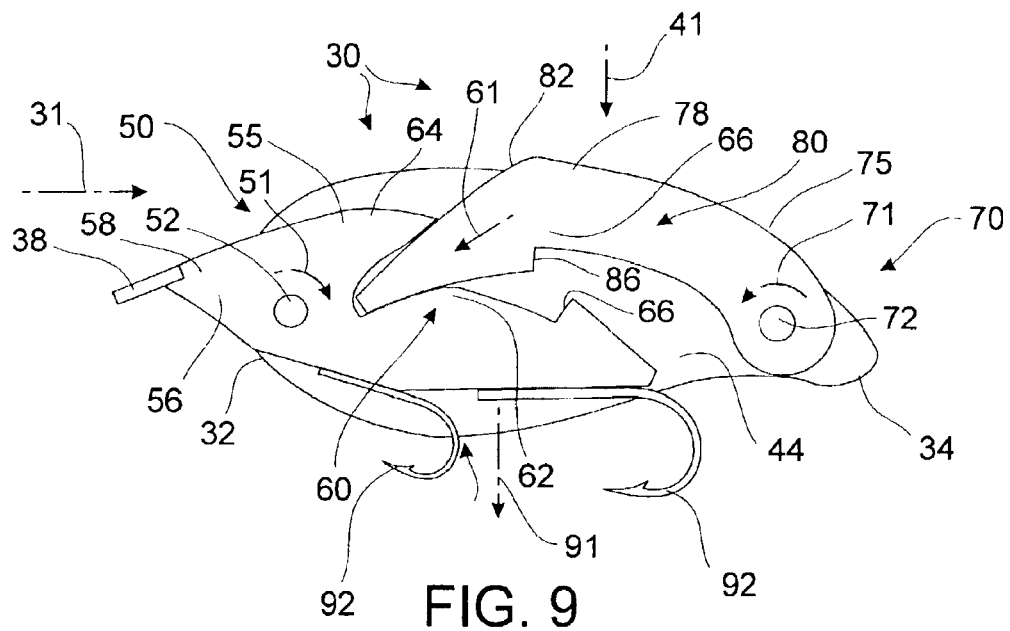
FIG. 9 is a cross-sectional view similar to FIG. 7 but showing the lure with the hook in a exposed position.
Figure 10:
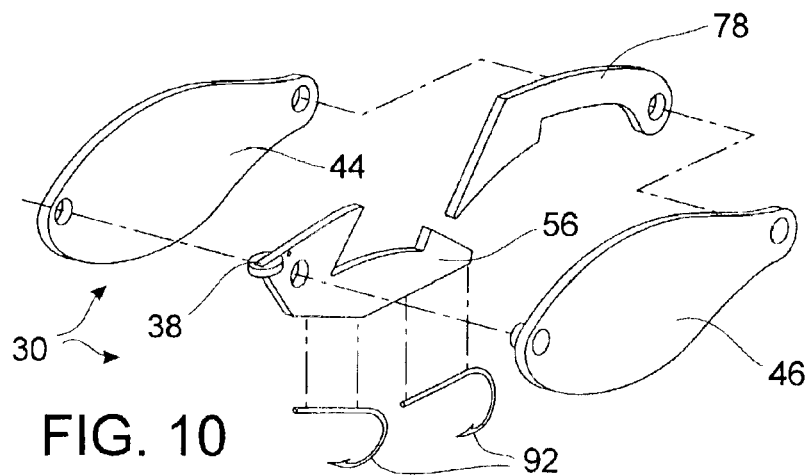
FIG. 10 is a partially exploded view thereof.
Figure 11:
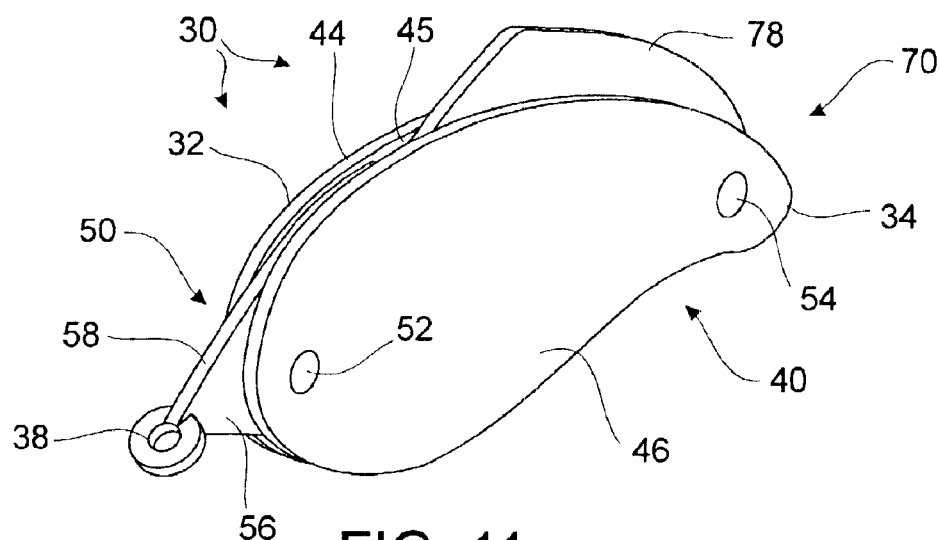
FIG. 11 is a perspective view of another exemplary embodiment in accordance with the invention.
Figure 12:
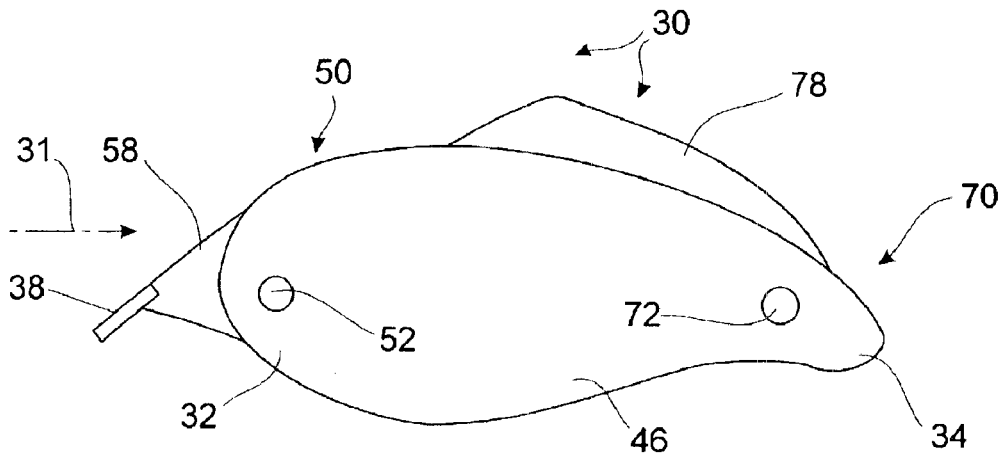
FIG. 12 is a side elevational thereof, with the opposite side being a mirror image thereof.
Figure 13:
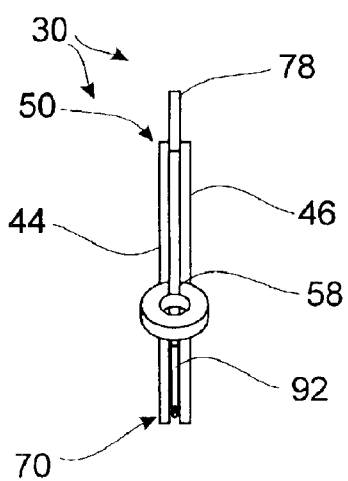
FIG. 13 is a front elevational view thereof.
Figure 14:
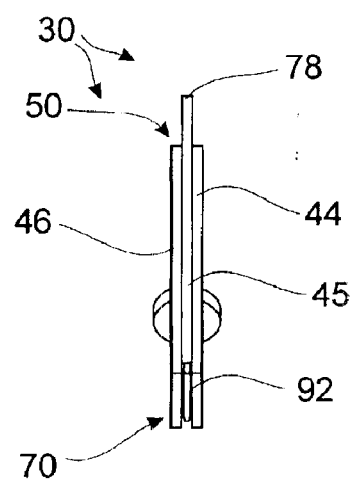
FIG. 14 is a rear elevational view thereof.
Figure 15:
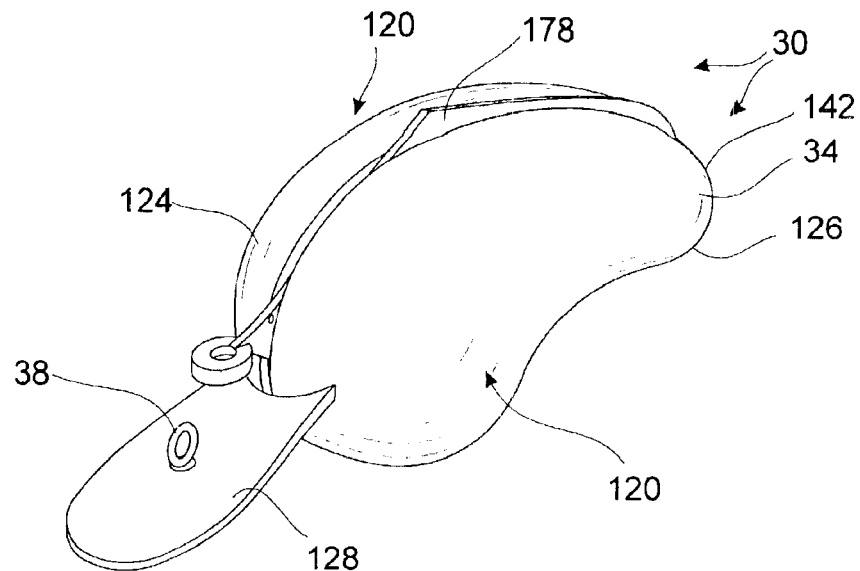
FIG. 15 is a perspective view of another exemplary embodiment in accordance with the invention.
Figure 16:
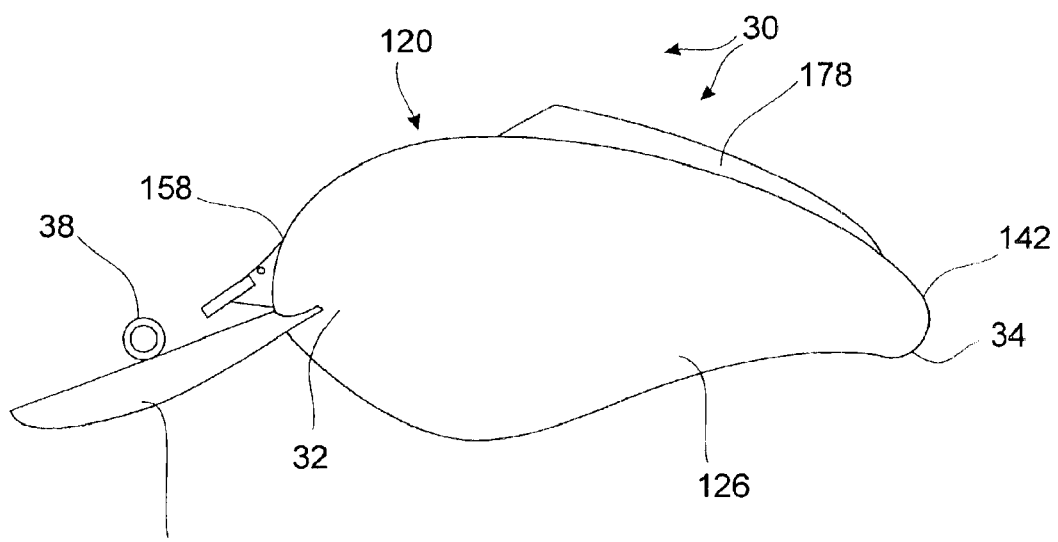
FIG. 16 is a side elevational thereof, with the opposite side being a mirror image thereof.
Figure 17:
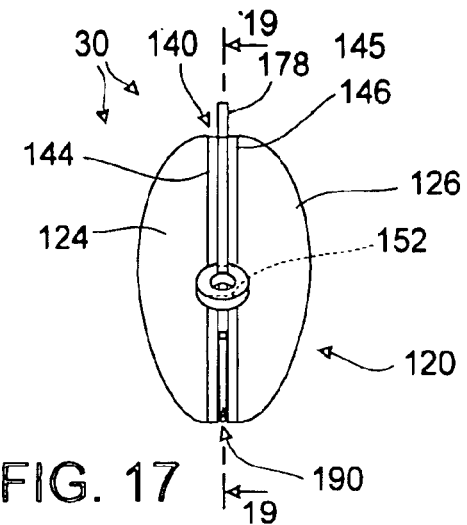
FIG. 17 is a front elevational view thereof.
Figure 18:
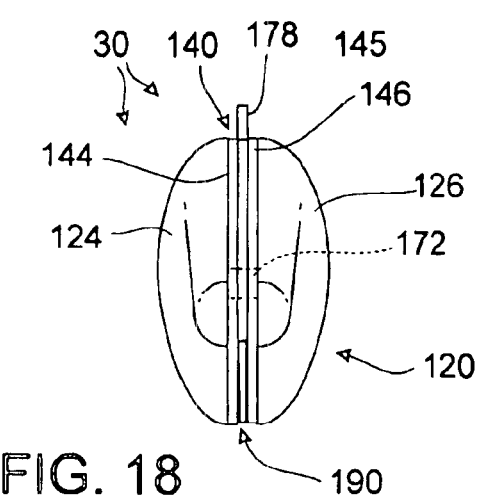
FIG. 18 is a rear elevational view thereof.
Figure 19:
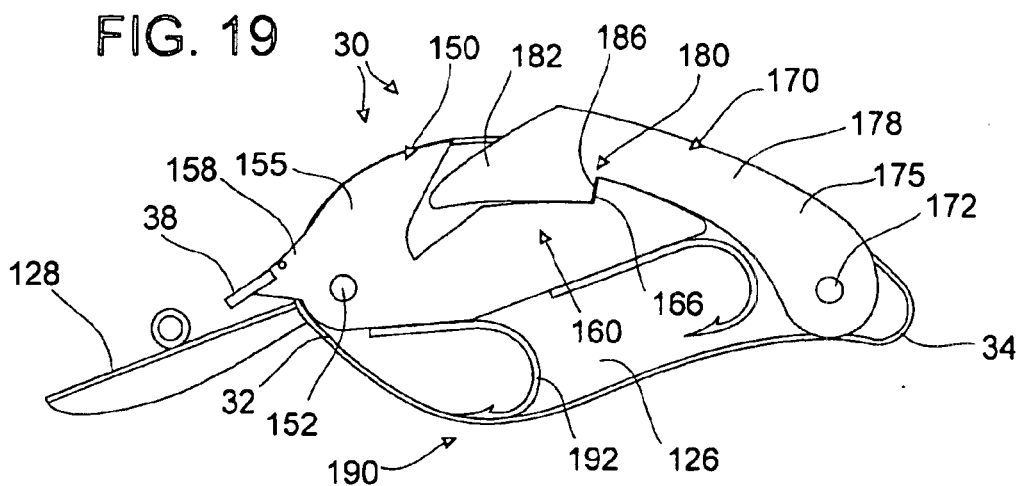
FIG. 19 is a cross-sectional view taken along line 19—19 of FIG. 17.
Figure 20:
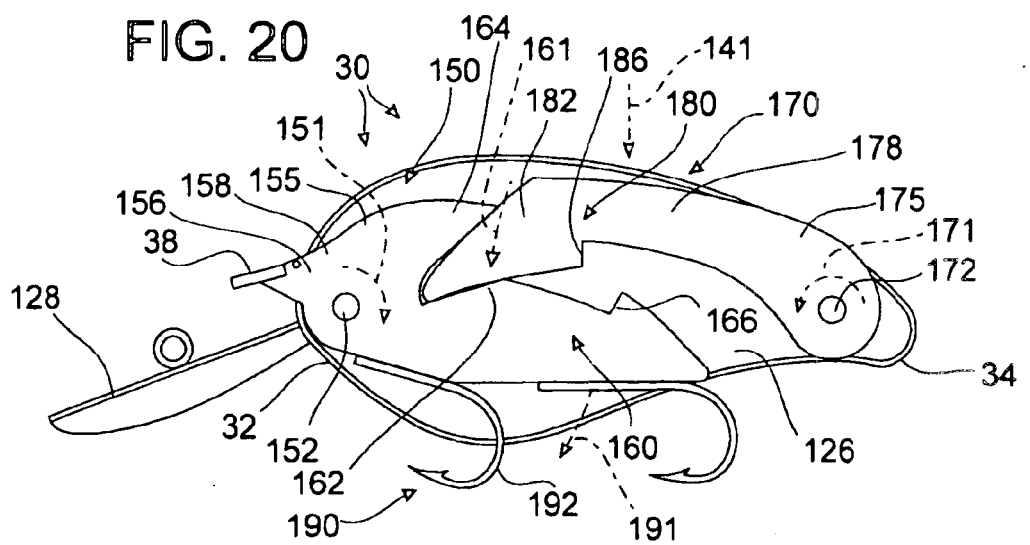
FIG. 20 is a cross-sectional view similar to FIG. 19 but showing the lure with the hook in an exposed position.
Figure 21:
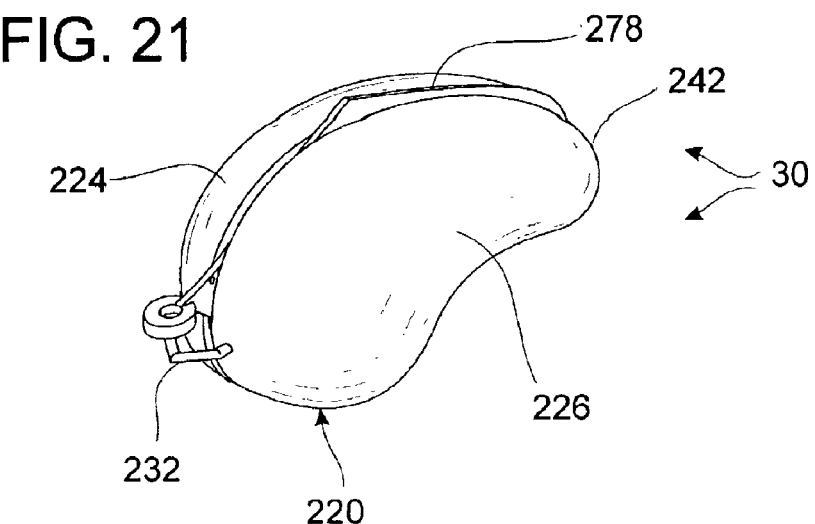
FIG. 21 is a perspective view of another exemplary embodiment in accordance with the invention.
Figure 22:
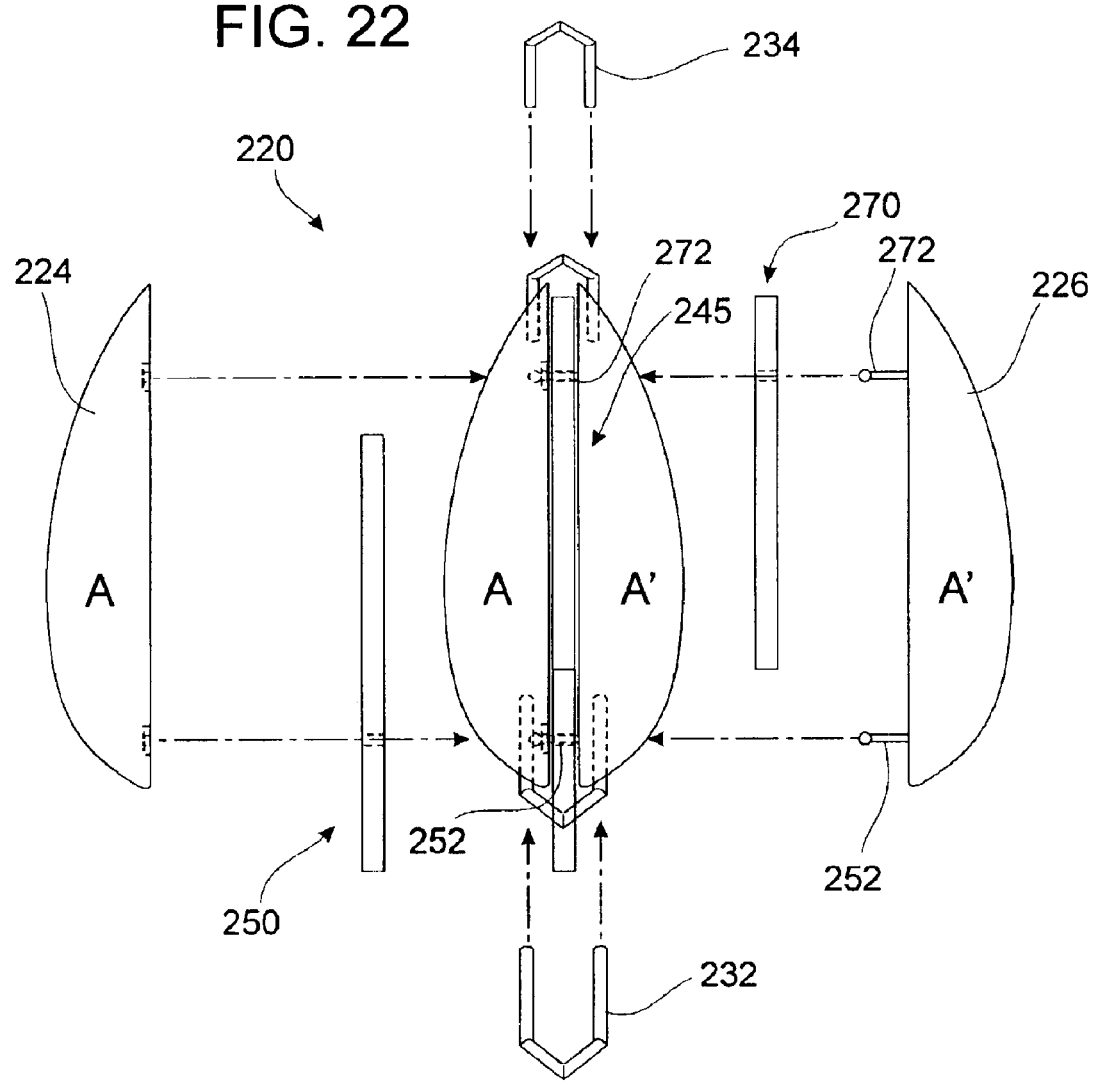
FIG. 22 is a partially exploded perspective view showing removal of various components of the fishing lure.
Figure 23:
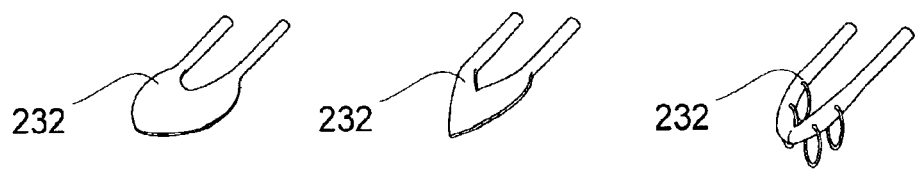
FIG. 23 is a perspective view of various noise components of the fishing lure.
Figure 24:
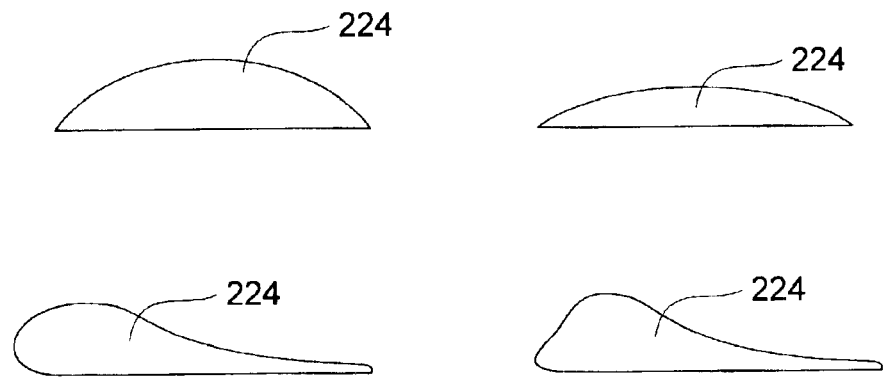
FIG. 24 is a perspective view of various body components of the fishing lure.
Figure 25:
FIG. 25 is a perspective view of various tail components of the fishing lure.
Figure 26:
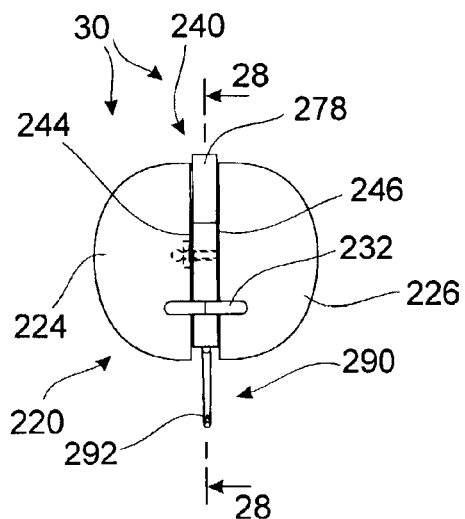
FIG. 26 is a front elevational view thereof.
Figure 27:
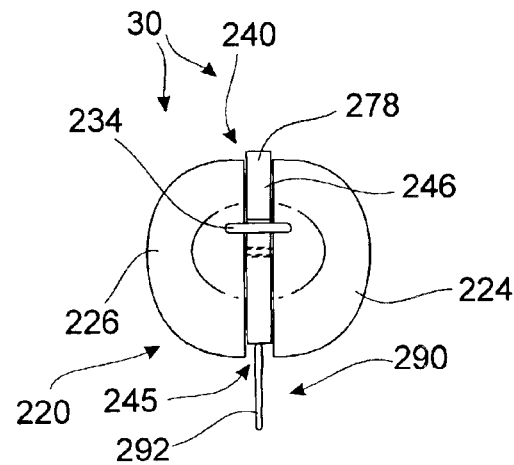
FIG. 27 is a rear elevational view thereof.
Figure 28:
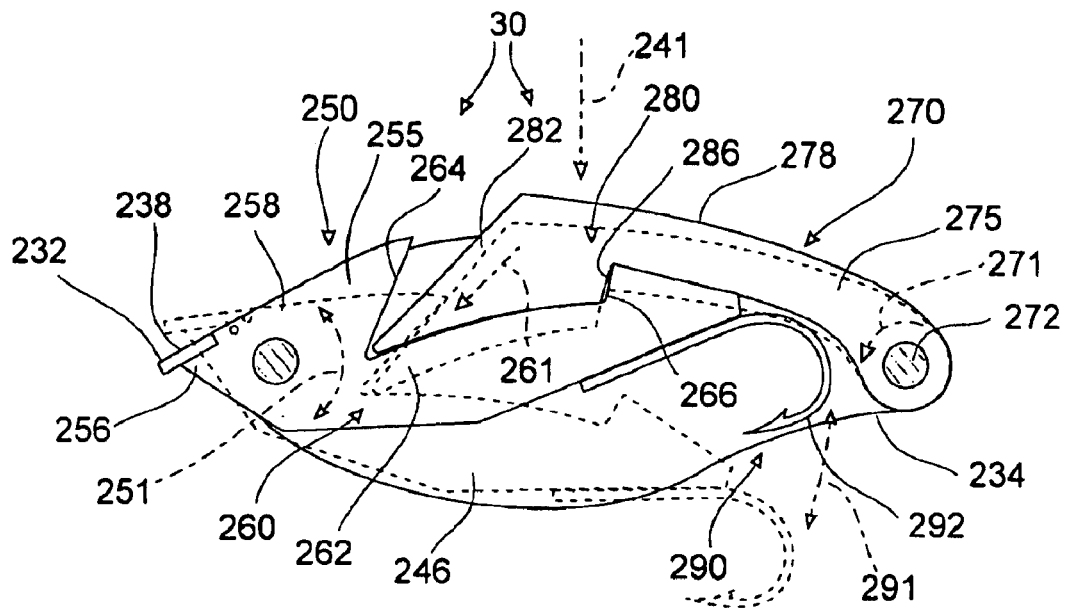
FIG. 28 is a cross-sectional view taken along line 28—28 of FIG. 26.
Figure 29:
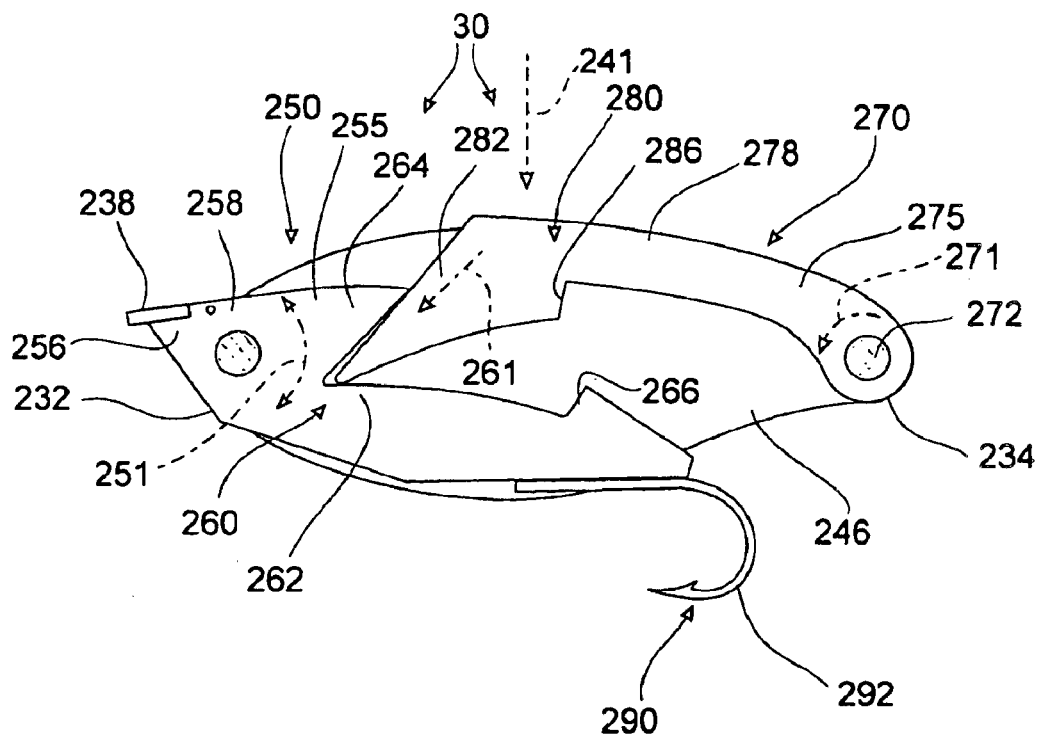
FIG. 29 is a cross-sectional view similar to FIG. 28 but showing the lure with the hook in a exposed position.

When fishing with the lure 30, the movement of the respective legs 50, 70 controls deployment of the hook assembly 90. As lure 30 is either cast through the air or retrieved through the water, aerodynamic and hydrodynamic forces act against legs 50 and then leg 70 to retain hook assembly 90 interiorly of body 40. These aerodynamic or hydrodynamic forces are generally represented the arrow identified by reference numeral 31 (FIG. 5). The angle of contact between the lure front 32 and more particularly the collector 58 may be varied but in one exemplary embodiment angles of contact between 15 and 75° with a typical retrieval rate being between 1 and 15 feet per minute are acceptable to retain hook assembly 90 in a retracted position in body 40. Only when the hydrodynamic force 31 is overcome by a sufficient downward force (indicated by the arrow identified by reference numeral 41), such as that exerted by a fish during a predatory strike, is leg 50 biased from its position retracting hook assembly 90 into active deployment of hook 92.

When a powerful downward force 41 is exerted on the exposed trigger 78, leg 70 rotates about axis 72 (indicated by the arrow identified with reference numeral 71) to force follower 82 to slide in slot 62. The movement of follower 82 in slot 62 is generally indicated by the arrow identified with reference numeral 61.

As leg 50 moves downwardly in the direction indicated by arrow 91, it rotates about axis 52 (indicated by the arrow identified with reference numeral 51) to expose the hook assembly 90 and hook 92 to impale fish 35.

In another exemplary embodiment, a fishing lure 30 in accordance with the present invention includes a slim hook and trigger compartment 140 that is adapted to be placed between the halves 124, 126 of a conventional fishing lure 120 with a spoon 128 to thereby enable the removal of conventional fishing hooks associated therewith.

The slim hook and trigger compartment 140 is similar to the hollow body 40. Compartment 140 includes two spaced apart parallel side plates 144, 146 that define a hollow interior 145. Plates 144, 146 are spaced apart by two pins or axles or axes. Ideally, the side plates 144, 146 have an outline similar to that of the lure halves 124, 126. Thus, the hook and trigger compartment 140 may be easily placed between the lure halves 124, 126 and confined to the general outline of lure 30.

The compartment interior 145 houses portions of two pivoting legs 150 and 170. The front leg 150 is preferably mounted proximate the lure front 32 by the front pin or axis 152 that is also proximate the lure front 32 while the rear leg 170 is preferably mounted proximate the lure rear 34 and the rear axis 172 is also proximate the lure rear 34. Each pin axis 152, 172 passes through a hole penetrating each leg to rotatably secure each leg 150, 170 to the compartment 140.

Each leg 150, 170 is thus independently captivated in the housing interior 145 by the opposite axes 152, 172 respectively. As a result, the legs 150, 170 are rotatably captivated between the two parallel side plates 142, 144 by either axis 152 or 172.

The tolerance between the parallel plates 142, 144 is such that the legs 150, 170 can move freely within, without allowing the legs 150, 170 enough space to pass. In one exemplary embodiment, the tolerance between plates 142, 144 is approximately 0.1 to 0.5 inches.

Each leg 150, 170 includes a frame 155, 175. The leading or front portion 156 of frame 155 protrudes outwardly from interior 145 to form a leading collector 158 to which leader 38 is integrally secured. When the lure 30 is drawn through water, the passing water strikes collector 158 to hydrodynamically retain the hook assembly 190 within the interior 145, as will be more fully discussed hereinafter.

The front leg frame 155 extends rearwardly from the collector 158, forming an elongated upper section 160 adjacent the lowermost portion 180 of rear frame 170. The upper section 160 is cut by a central arcuate slot 162 that receives a protruding follower 182 on the rear leg 170. A forward ledge 164 defines the forward extent of the slot 162 while a rearward ledge 166 forms a keeper defining the rearmost extent of the slot 162.

The rear leg 170 functions as a trigger mechanism by rotating around the rear mounting axis 172 and against the front leg 150 to force it downwardly to expose the trigger assembly 190 during a strike.

The rear leg 170 includes a frame 175. The frame 175 extends forwardly from the rear axis 172. A substantial trigger portion 178 is defined along the uppermost edge of the frame 175. The trigger protrudes upwardly from the interior 145 and resides exteriorly to the body 140. The forward edge and lowermost portion 180 of frame 170 forms a follower 182 the slides in slot 162. The rearward ledge 186 of the follower 182 forms a keeper defining the rearmost extent of the follower 182.

The follower 182 slides in slot 162 as the lure 30 is used. When cast or retrieved, the follower ledge 186 abuts the slot ledge 166 to keep trigger 178 exposed fully and hook assembly 190 retracted fully. When struck, the trigger 178 is forced downwardly to force follower 182 to slide in slot 162 and thereby to expose hook assembly 190.

The front leg 150 supports the hook assembly 190 with one or more hooks 192 on its lowermost portion. The front leg 150 is aligned with the rear leg 170 in a common plane, in the space provided between the two parallel mounting plates 144, 146. The front leg is mounted around an axis 152 and is allowed to move freely between the two fixed mounting plates 144, 146. The legs 150, 170 are captivated between the two mounting plates 144, 146 such that they are not allowed to separate from each other during respective movements by either leg.

When fishing with the lure 30, the movement of the respective legs 150, 170 controls deployment of the hook assembly 190. As lure 30 is either cast through the air or retrieved through the water, aerodynamic and hydrodynamic forces act against legs 150 and then leg 170 to retain hook assembly 190 interiorly of compartment 140. These aerodynamic or hydrodynamic forces are generally represented the arrow identified by reference numeral 31 (FIG. 5). The angle of contact between the lure front 32 and more particularly the collector 158 may be varied but in one exemplary embodiment angles of contact between 15 and 75° with a typical retrieval rate being between 1 and 1.5 feet per minute are acceptable to retain hook assembly 190 in a retracted position in compartment 140. Only when the hydrodynamic force 31 is overcome by a sufficient downward force (indicated by the arrow identified by reference numeral 141), such as that exerted by a fish during a predatory strike, is leg 150 biased from its position retracting hook assembly 190 into active deployment of hook 192.

When a powerful downward force 141 is exerted on the exposed trigger 178, leg 170 rotates about axis 172 (indicated by the arrow identified with reference numeral 171) to force follower 182 to slide in slot 162. The movement of follower 182 in slot 162 is generally indicated by the arrow identified with reference numeral 161.

As leg 150 moves downwardly in the direction indicated by arrow 191, it rotates about axis 152 (indicated by the arrow identified with reference numeral 151) to expose the hook assembly 190 and hook 192 to impale fish 35.

In another exemplary embodiment, the fishing lure 30 includes a configurable lure 220 with multiple user selectable components. The components may be easily configured by a user to meet a variety of desirable fishing characteristics for a particular lure 220. The configurable lure 220 may include a front member 232, a rear member 234, and sides 224, 226.

Thus, the multiple component fishing lure includes six components, with (2) sides 224, 226 defining an interior 240 and a front lock or baffle 232 and a rear lock or tail 234. The sides 224 are interchangeable and snap together with the legs 250, 270 mounted to axles 252, 272 on side plates 244, 246 defining compartment 240. The user may select the front and rear locks 232, 234 based on conditions and desired lure characteristics, including depth of use, weight, action, and/or style.

The interior compartment 240 is similar to the slim hook and trigger compartment 140 and the hollow body 40. Compartment 240 includes two spaced apart parallel side plates 244, 246 that define a hollow interior 245. Plates 244, 246 are spaced apart by two pins or axles or axes. Ideally, the side plates 244, 246 have an outline similar to that of the lure halves 224, 226. Thus, the hook and trigger compartment 240 may be easily placed between the lure halves 224, 226 and confined to the general outline of lure 30.

The compartment interior 245 houses portions of two pivoting legs 250 and 270. The front leg 250 is preferably mounted proximate the lure front 32 by the front pin or axis 252 that is also proximate the lure front 32 while the rear leg 270 is preferably mounted proximate the lure rear 34 and the rear axis 272 is also proximate the lure rear 34. Each pin axis 252, 272 passes through a hole penetrating each leg to rotatably secure each leg 250, 270 to the compartment 240.

Each leg 250, 270 is thus independently captivated in the housing interior 245 by the opposite axes 252, 272 respectively. As a result, the legs 250, 270 are rotatably captivated between the two parallel side plates 242, 244 by either axis 252 or 272.

The tolerance between the parallel plates 242, 244 is such that the legs 250, 270 can move freely within, without allowing the legs 250, 270 enough space to pass. In one exemplary embodiment, the tolerance between plates 242, 244 is approximately 0.1 to 0.5 inches.

Each leg 250, 270 includes a frame 255, 275. The leading or front portion 256 of frame 255 protrudes outwardly from interior 245 to form a leading collector 258 to which leader 238 is integrally secured. When the lure 30 is drawn through water, the passing water strikes collector 258 to hydrodynamically retain the hook assembly 290 within the interior 245, as will be more fully discussed hereinafter.

The front leg frame 255 extends rearwardly from the collector 258, forming an elongated upper section 260 adjacent the lowermost portion 280 of rear frame 270. The upper section 260 is cut by a central arcuate slot 262 that receives a protruding follower 282 on the rear leg 270. A forward ledge 264 defines the forward extent of the slot 262 while a rearward ledge 266 forms a keeper defining the rearmost extent of the slot 262.

The rear leg 270 functions as a trigger mechanism by rotating around the rear mounting axis 272 and against the front leg 260 to force it downwardly to expose the trigger assembly 290 during a strike.

The rear leg 270 includes a frame 275. The frame 275 extends forwardly from the rear axis 272. A substantial trigger portion 278 is defined along the uppermost edge of the frame 275. The trigger 278 protrudes upwardly from the interior 245 and resides exteriorly to the body 240. The forward edge and lowermost portion 280 of frame 270 forms a follower 282 the slides in slot 262. The rearward ledge 286 of the follower 282 forms a keeper defining the rearmost extent of the follower 282.

The follower 282 slides in slot 262 as the lure 30 is used. When cast or retrieved, the follower ledge 286 abuts the slot ledge 266 to keep trigger 278 exposed fully and hook assembly 290 retracted fully. When struck, the trigger 278 is forced downwardly to force follower 282 to slide in slot 262 and thereby to expose hook assembly 290.

The front leg 250 supports the hook assembly 290 with one or more hooks 292 on its lowermost portion. The front leg 250 is aligned with the rear leg 270 in a common plane, in the space provided between the two parallel mounting plates 244, 246. The front leg is mounted around an axis 252 and is allowed to move freely between the two fixed mounting plates 244, 246. The legs 250, 270 are captivated between the two mounting plates 244, 246 such that they are not allowed to separate from each other during respective movements by either leg.

When fishing with the lure 30, the movement of the respective legs 250, 270 controls deployment of the hook assembly 290. As lure 30 is either cast through the air or retrieved through the water, aerodynamic and hydrodynamic forces act against legs 250 and then leg 270 to retain hook assembly 290 interiorly of compartment 240. These aerodynamic or hydrodynamic forces are generally represented the arrow identified by reference numeral 31 (FIG. 5). The angle of contact between the lure front 32 and more particularly the collector 258 may be varied but in one exemplary embodiment angles of contact between 15 and 75° with a typical retrieval rate being between 1 and 15 feet per minute are acceptable to retain hook assembly 290 in a retracted position in compartment 240. Only when the hydrodynamic force 31 is overcome by a sufficient downward force (indicated by the arrow identified by reference numeral 241), such as that exerted by a fish during a predatory strike, is leg 250 biased from its position retracting hook assembly 290 into active deployment of hook 292.

When a powerful downward force 241 is exerted on the exposed trigger 278, leg 270 rotates about axis 272 (indicated by the arrow identified with reference numeral 271) to force follower 282 to slide in slot 262. The movement of follower 282 in slot 262 is generally indicated by the arrow identified with reference numeral 261.

As leg 250 moves downwardly in the direction indicated by arrow 291, it rotates about axis 252 (indicated by the arrow identified with reference numeral 251) to expose the hook assembly 290 and hook 292 to impale fish 35.

The action of retrieving a fishing lure 30, using this invention, will allow the hook of the invention to remain retracted between the two parallel plates through the flow of water against a forward portion attached in a plane perpendicular to the lure front. The internal portions of the lure of the invention are designed and positioned within the lure (as determined by the size and shape of the intended exterior outline of the lure) such that the front forward movement is prohibited when the hook(s) are in the maximum exposed (strike) position. Rear upward movement is prohibited once the front and rear internal portions align along the common length between them (in the retracted, neutral position).

Whereas, the present invention has been described in relation to the drawings attached hereto, it should be understood that other and further modifications, apart from those shown or suggested herein, may be made within the spirit and scope of this invention.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A springless fishing lure with a retractable hook adapted to be deployed in a body of water and retrieved through the water in a substantially snag-free configuration to catch a fish, said lure comprising:

a body mimicking bait to attract the fish to said lure and entice the fish into striking said lure, said body including at least two rigid plates and said plates are spaced apart and secured to each other by at least two rigid axles extending therebetween, to define a compartment therebetween;

a hook and trigger assembly housed in said compartment and said hook and trigger assembly is captivated in said compartment by said axles, said assembly including a springless trigger responsive to the fish striking and at least one hook actuated by said springless trigger response to thereby immediately expose said hook in the mouth of the fish as the mouth initially closes;

a leading collector responsive to passing water resulting from the forward movement of said lure through the water, said collector adapted to bias said hook in said body unless said lure is within the fish; and, wherein said hook and trigger assembly automatically retains and resets said hook within said body during the retrieval of said lure as a result of the bias of said collector upon said hook and trigger assembly and wherein said collector is responsive to the hydraulic pressure created by the movement of said lure through the water during retrieval.

2. The lure as recited in claim 1, wherein said trigger is mounted upon the rearward of said axles and said hook is mounted on the forward of said axles.

3. The lure as recited in claim 2, wherein said body includes removable portions that enable a user to selectively alter the cosmetic appearance of said body.

4. The lure as recited in claim 3, wherein said portions include parallel side plates.

5. The lure as recited in claim 3, wherein said portions include a nose baffle adapted to be deployed adjacent the front of said lure.

6. The lure as recited in claim 3, wherein said portions include a tail adapted to be deployed adjacent the rear of said lure.

7. A springless fishing lure with a retractable hook adapted to be deployed in water and retrieved through the water in a substantially snag-free configuration to catch a fish, with an exterior body mimicking bait to attract the fish to the lure and entice the fish into striking the lure, said springless lure comprising:

- a hook and trigger assembly housed in said body having a front and a rear and spaced apart plates extending therebetween, said assembly including a trigger having a protruding portion extending outwardly from said lure, said trigger responsive to the fish striking and secured between said plates by an axle captivated between said plates proximate said rear and at least one hook secured between said plates by an axle captivated between said plates proximate said front, said hook actuated by said trigger response to thereby immediately expose said hook in the mouth of the fish as the mouth initially closes;
- a leading collector responsive to passing water resulting from the forward movement of said lure through the water, said collector adapted to solely bias said hook in said body unless said lure is within the fish; and, wherein said hook and trigger assembly automatically retains and resets said hook within said body during the retrieval of said lure solely as a result of the bias of said collector upon said hook and trigger assembly and wherein said collector is responsive to the hydraulic pressure created by the movement of said lure through the water during retrieval.

8. The lure as recited in claim 7, wherein said body includes removable portions that enable a user to selectively alter said body.

9. The lure as recited in claim 8, wherein said portions include parallel side plates.

10. The lure as recited in claim 8, wherein said portions include a nose baffle adapted to be deployed adjacent the front of said lure.

11. The lure as recited in claim 8, wherein said portions include a tail adapted to be deployed adjacent the rear of said lure.

* * * * *